United States Patent [19]
Tsuzuki

[11] Patent Number: 5,348,056
[45] Date of Patent: Sep. 20, 1994

[54] THREE-DIMENSIONAL WOVEN FABRIC WITH VARIED THREAD ORIENTATIONS

[75] Inventor: Makoto Tsuzuki, Tsukuba, Japan

[73] Assignee: Three-D Composites Research Corporation, Tsukuba, Japan

[21] Appl. No.: 958,345

[22] PCT Filed: Apr. 23, 1992

[86] PCT No.: PCT/JP92/00524

§ 371 Date: Jan. 21, 1993

§ 102(e) Date: Jan. 21, 1993

[87] PCT Pub. No.: WO92/18674

PCT Pub. Date: Nov. 29, 1992

[30] Foreign Application Priority Data

Apr. 23, 1991 [JP] Japan .................. 3-119343

[51] Int. Cl.$^5$ .................. D03D 13/00; D03D 41/00
[52] U.S. Cl. .................. 139/384 R; 139/DIG. 1; 139/11; 87/33; 428/175
[58] Field of Search .............. 139/11, DIG. 1, 384 R; 87/33; 428/175

[56] References Cited

U.S. PATENT DOCUMENTS 4,615,256 10/1986 Fukuta et al. .................. 139/11
5,067,525 11/1991 Tsuzuki et al. .................. 139/11

FOREIGN PATENT DOCUMENTS 2-259148 10/1990 Japan .
2-264055 10/1990 Japan .
2-307949 12/1990 Japan .

*Primary Examiner*—Andrew M. Falik
*Attorney, Agent, or Firm*—Oblon, Spivak, McClelland, Maier & Neustadt

[57] ABSTRACT

In a three-dimensional fabric as woven on a rotor-carrier type 3D fabric weaving machine, there is provided a reinforcing three-dimensional fabric for composite material, which is imparted with unevenly functioning characteristics by arbitrarily changing the thread orientation angle in part of the fabric structure. In the weaving process of the three-dimensional fabric, a large number of threads, which are oriented with an angle of inclination relative to the longitudinal direction of the fabric, are folded back at the surface of the fabric as they are continuously interwoven in the longitudinal direction thereof, and varied orientation angle portions are formed in part of the sectional area of the fabric by partially changing the angle of inclination of thread portions which continuously extend between adjacent weave portions of the fabric. The three-dimensional fabric can be woven on a rotor-carrier type 3D fabric weaving machine having a large number of rotors arranged in a matrix of multiple rows and arrays alternately with a large number of thread carriers, dividing the rotors into two groups each consisting of rotors in non-confronting positions, repeating a cycle of regular weaving operations where firstly rotors of a first group are turned through 90° or 180° in one direction and then rotors of the second group are turned through 90° or 180° in the reverse direction.

4 Claims, 10 Drawing Sheets

FIG. 11

THREE-DIMENSIONAL WOVEN FABRIC WITH VARIED THREAD ORIENTATIONS

BACKGROUND OF THE INVENTION

1. Field of the Art This invention relates to a reinforcing three-dimensional woven fabric construction which is partially varied in thread orientation angle suitably for application to an unevenly functioning composite material, and a method for producing such woven fabrics.

2. Prior Art The present inventors proposed in their previous patent application, Japanese Laid-Open Patent Application H2-259148, a technology of weaving three-dimensional 4- or 5-axis woven fabrics with various fiber orientation angles in a facilitated manner by the use of a rotor-carrier type three-dimensional fabric weaving machine (hereinafter referred to simply as a "3D weaving machine" for brevity). According to the previously proposed method of weaving a three-dimensional fabric, as will be described hereinafter with reference to FIGS. 6 and 7, there are employed a large number of rotors which are arranged in a matrix of multiple rows and arrays alternately with thread carriers, which are gripped between rotors in adjacently confronting positions. The rotors are each provided with guide grooves on the four sides of its circumference in such a way as to grip the carriers between the guide grooves on the rotors in adjacently confronting cooperative positions and in a configuration corresponding to the sectional shape of the three-dimensional fabric to be produced. When one of adjacently confronting rotors is turned, the position of the associated thread carrier is shifted under guidance of the groove on the other one of the confronting rotors, and these actions of rotors and thread carriers are repeated to weave a three-dimensional fabric of a required shape. Besides, in such a weaving operation, the entire rotors are divided into two groups each consisting of rotors which are not located in adjacent positions in row and array. Rotors of one group are held stationary to serve as non-rotatable fixed guides while rotors of the other group are turned through 90° or 180° in one direction. In the next phase of operation, the rotors of the firstly turned group are held stationary to serve as non-rotatable fixed guides while the rotors of the other group are turned through 90° or 180° in the reverse direction. These weaving actions are repeated to weave a three-dimensional fabric.

According to the above-mentioned previously proposed technology, it is possible to obtain a three-dimensional woven fabric construction with an arbitrary fiber orientation angle, which can be used effectively for various purposes. However, the fabric as a whole has a uniform fiber orientation angle, so that, depending upon the use of the three-dimensional fabric, it fails to utilize the high-function fiber to a maximum degree.

Accordingly, it is desirable to make use of the high-function fiber more effectively by partially varying the fiber orientation angle in consideration of the stresses which would occur in various portions of the woven structure.

SUMMARY OF THE INVENTION

It is a primary object of the present invention to provide a reinforcing three-dimensional fabric construction for composite material, the fabric being imparted with unevenly functioning characteristics by partially varying the thread orientation angle in an arbitrary manner in the weaving process of a three-dimensional 4- or 5-axis woven fabric as produced easily by the above-mentioned prior art rotor-carrier type three-dimensional fabric weaving machine, and a method for producing such reinforcing three-dimensional woven fabric.

It is another object of the present invention to provide a method for producing a three-dimensional woven fabric, permitting one to alter the orientation angle by an extremely simplified operation.

In accordance with the present invention, the above-stated objectives are achieved by the provision of a three-dimensional woven fabric construction for unevenly functioning composite material. More specifically, in a three-dimensional fabric which is formed in a desired cross-sectional shape by the use of a large number of fiber threads oriented with an angle of inclination from the longitudinal direction of the three-dimensional fabric, folding back the fiber threads at the surface of the fabric as the fiber threads are interwoven with each other continuously in the longitudinal direction, there is provided a three-dimensional fabric construction in which a thread portion of a varied orientation angle is provided in part of the sectional area of the fabric by altering the orientation angle, relative to the longitudinal direction of the fabric, of threads extending continuously between two adjacent weave portions of the fabric.

In the above-described three-dimensional fabric structure, a core thread or threads which are oriented rectilinearly in the longitudinal direction of the three-dimensional fabric may be woven thereinto in the entire or in part of the sectional area of the fabric.

Further, according to the present invention, there is provided a method of producing a three-dimensional woven fabric by the use of a rotor-carrier type three-dimensional fabric weaving machine as mentioned above wherein the rotors gripping the thread carriers within the entire sectional shape of the fabric are divided into two groups, the method comprising the steps of repeating a cycle of regular weaving operation of turning rotors of the first group through 90° or 180° in one direction using rotors of the second group as non-rotatable guide means and then rotating the rotors of the second group through 90° or 180° in the reverse direction using the rotors of the first group as non-rotatable guide means, inserting at a suitable frequency a cycle of partially regular weaving operation in which the rotation of the rotors of the two groups is stopped in part of the sectional area of the three-dimensional fabric while operating the rotors in other portions in a regular way, thereby forming thread portions varied in orientation angle or in angle of inclination from the longitudinal direction of the three-dimensional fabric in part of the sectional area thereof.

In the above weaving process, core threads which are oriented rectilinearly in the longitudinal direction can be woven into the three-dimensional fabric in part of or in the entire the sectional area of the fabric by rectilinearly passing the core threads through center portions of selected ones of the rotors which grip the thread carriers therebetween.

The three-dimensional fabric of the above-described construction can be woven to have an arbitrary sectional shape depending upon the purpose of its use, and is constituted by fiber threads which are basically oriented with a suitable angle of inclination from the longitudinal direction of the fabric, with the angle of orientation partially altered to provide thread portions of varied orientation angle which impart unevenly functioning characteristics to desired localities of the three-dimensional fabric structure.

Further, in the weaving process of a three-dimensional fabric by the use of the previously proposed rotor-carrier type 3D fabric weaving machine, there can be produced a 4-axis reinforcing three-dimensional fabric for unevenly functioning composite material by a simple means, namely, simply by inserting between the cycles of regular weaving operation a suitable number of cycles of partially regular weaving operation in which the rotation of the rotors is stopped in a certain locality in the sectional area of the three-dimensional fabric while the rotors in other localities are operated in a regular manner.

Further, there can be produced a 5-axis three-dimensional fabric with increased strength in the longitudinal direction, by passing core threads through center portions of selected ones of the rotors which hold the thread carriers.

The above and other objects, features and advantages of the invention will become apparent from the following description and the appended claims, taken in conjunction with the accompanying drawings which show by way of example some preferred embodiments of the invention.

BEST MODE FOR CARRYING OUT THE INVENTION

Referring to FIGS. 1 to 4, there are illustrated by way of example three outer views of three-dimensional fabric constructions according to the present invention. These three-dimensional fabric constructions are useful for reinforcing unevenly functioning composite material, and are formed in an arbitrary shape in section although 4-axis fabrics of square shape (FIG. 1) and I-shape (FIGS. 2 and ) in section (FIG. 1) and a 5-axis fabric of I-shape (FIG. 4) in section are shown to simplify the explanation of the conditions of reinforcing thread orientation.

The three-dimensional fabrics 10, 20 and 30 are each formed from a large number of threads 1 which are oriented with an angle of inclination from the longitudinal direction ( in the weaving direction) of the fabric. The threads 1 are turned back at the surface of the fabric and interwoven continuously in the longitudinal direction of the fabric in such a way as to impart a necessary shape to the latter. In certain portions of a sectional area, these three-dimensional fabrics 10, 20 and 30 have thread portions of a varied orientation angle 12, 22 to 25 which are oriented at a different orientation angle from thread portions 11, 12 or 31 of a basic orientation angle. In these varied orientation angle portions, the angle of inclination of a thread 1 which continuously extends between adjacent weave portions of the three-dimensional fabric is varied relative to the longitudinal direction of the fabric.

Figure 4:
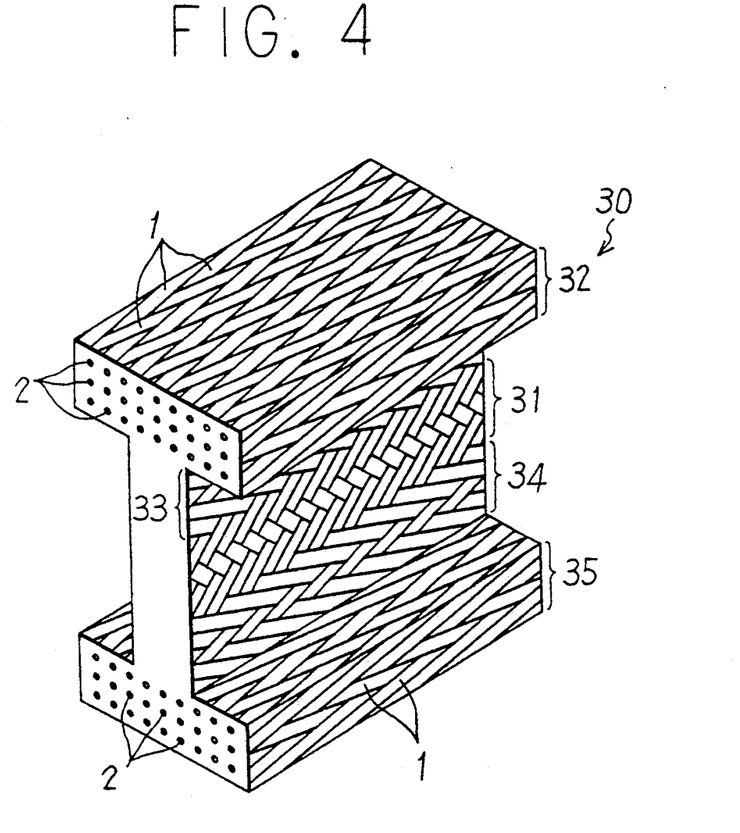
FIG. 4 is a perspective view of a modification having core threads incorporated into the fabric structure of FIG. 2 to impart thereto more conspicuous unevenly functioning characteristics.

In the case of the three-dimensional fabric 30 shown in FIG. 4, core threads 2, which are oriented rectilinearly in the longitudinal direction of the fabric, are woven into varied orientation angle portions 32 and 35 on the upper and lower sides of the I-shaped section. These core threads 2 may be incorporated arbitrarily in part of or in the entire sectional area of the fabric.

Explained below is a method of weaving a three-dimensional fabric by way of the fabric construction 30 as shown in FIG. 4.

Figure 6:
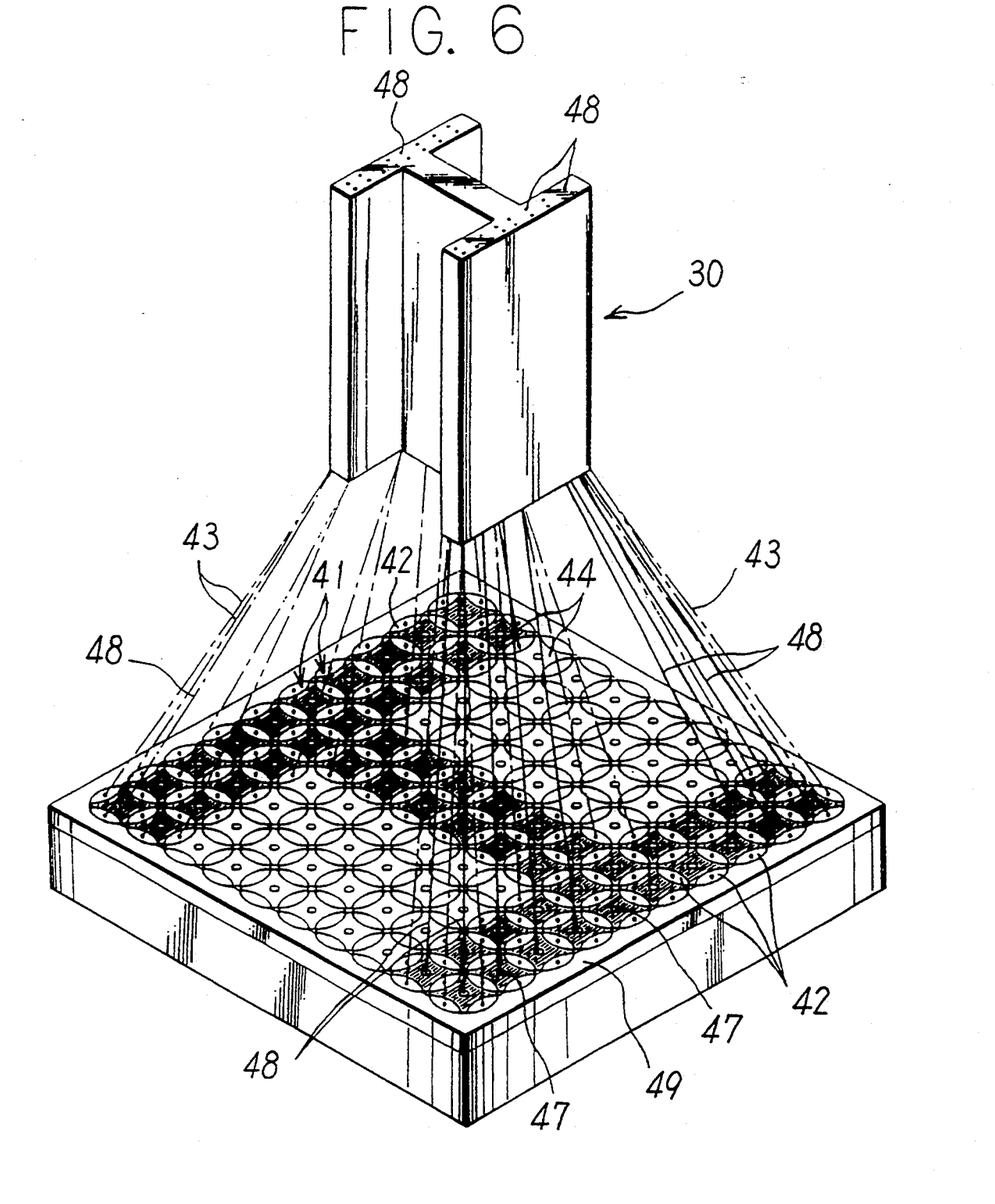
FIG. 6 is a perspective view of the three-dimensional fabric of FIG. 4 in the weaving process.
Figure 7:
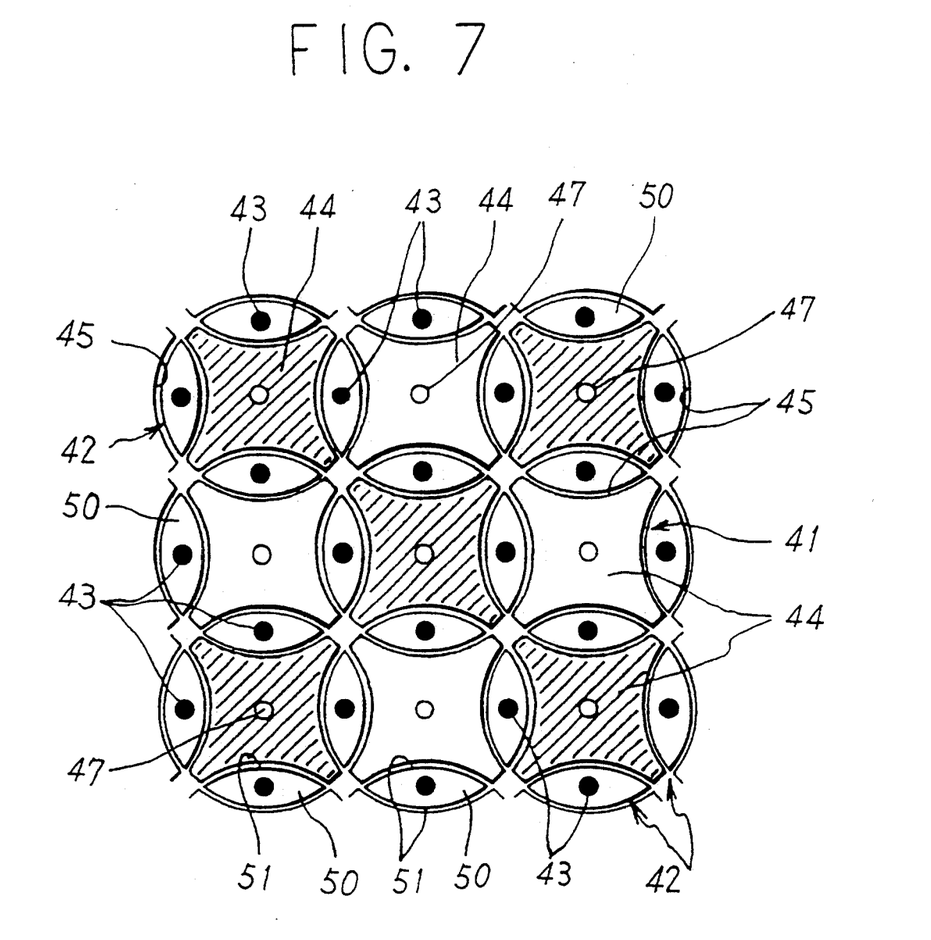
FIG. 7 is a perspective view of a carrier drive mechanism shown in FIG. 6.

For weaving the above-mentioned beam-like three-dimensional fabric, it is possible to employ a 3D fabric weaving machine as shown in FIGS. 6 and 7, which was previously proposed by the inventors as a rotor-carrier type 3D weaving machine as mentioned hereinbefore or which is similar to that of U.S. Pat. No. 5,067,525, which is incorporated herein by reference. Therefore, the construction and operation of this machine are briefly explained here with reference to those figures. As shown in FIG. 6, generally the machine is arranged to weave threads 43, which are unwound from the respective bobbins, by means of carrier drive units 41 which are arranged in a large number of rows and arrays along a carrier tracking surface to impart motions along predetermined loci to thread carriers 42 which support the bobbins.

The carrier drive units 41 are each provided with a rotor 44 of a shape as shown particularly in FIG. 7. The rotors 44 in adjacent positions embrace a thread carrier 42 therebetween and, for this purpose, are each provided with grooves 45 on four sides around the circumference thereof. The inner surface of each groove 45 is formed in an arc which has its center at the rotational axis of an adjacently located rotor 44, so that, as one of two adjacent rotors 44 is rotated, the groove 45 on the other rotor 44 functions as a guide for the thread carrier 42. The rotors of this sort are located closely to each other in multiple rows and arrays within a shift area of the thread carriers 42. A core thread passage hole 47 is provided in the rotational shaft at the center of each rotor 44. Core threads 48 are passed through and led out of core thread passage holes 47 of rotors in regions where the three-dimensional fabric needs reinforcement. Arrangements may be made to feed a core thread 48 from a bobbin which is mounted at the center of a rotor if desired.

In FIG. 6, the reference numeral 49 denotes a guide which is located in such a manner as to circumvent the shift area of the thread carriers 42.

Each thread carrier 42 which is embraced between the adjacently located rotors 44 is provided with a holder portion 50 with arcuate surfaces 51 which fit in the grooves 45 of adjacently located rotors 44. A bobbin can be mounted on the holder portion 50 of each thread carrier 42 if desired.

Prior to driving the thread carriers 42 by a multitude of drive units 41 with rotors 44 on the 3D-fabric weaving machine of the above arrangement, as shown in FIG. 6, the thread carriers 42 are arranged in a matrix conforming with the sectional shape of the three-dimensional fabric 30 to be produced. In the weaving process, the rotors 44 are divided into two groups each consisting of rotors which are not located in adjacent positions in row and array, and are driven group by group as will be described hereinlater by drive means which are not shown. In FIG. 7, the rotors of one group are distinguished by hatching from the rotors of the other group. The rotors of each group can be rotationally driven in a synchronized manner, but may be driven with a slight time lag from each other for the purpose of preventing interferences between carriers.

The drive means for rotors of each group are arranged to drive the respective rotors 44 intermittently each time for a rotational movement through 90° or 180° in the same direction, which is reverse to the direction of rotation of the rotors of the other group. In the following description, the rotors which are indicated by hatching in FIG. 7 fall in the group of rotors to be intermittently rotated through 90° or 180° in the clockwise direction (hereinafter referred to as "rotors of the first group"), while the rotors without hatching fall in another group of rotors to be intermittently rotated through 90° or 180° in a counterclockwise direction (hereinafter referred to as "rotors of the second group").

In a cycle of normal weaving operation, for example, firstly the rotors 44 of the first group are held stationary to serve as non-rotatable guides while the rotors 44 of the second group are rotated through 90° or 180° in one direction, and then the firstly rotated rotors of the second group are held stationary to serve as non-rotatable guides while the rotors of the first group are rotated through 90° or 180° in the opposite direction. Basically, this cycle of operation is repeated to weave the fabric.

Figure 8A:
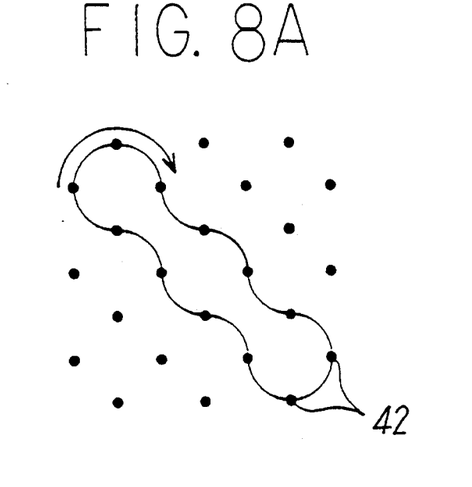
FIGS. 8A through 8C and FIGS. 9A through 9F are diagrammatic illustrations explanatory of loci of movement of the carriers in the previously proposed method.
Figure 8B:
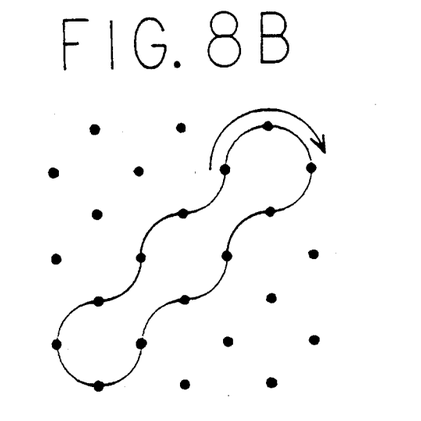
Figure 8C:
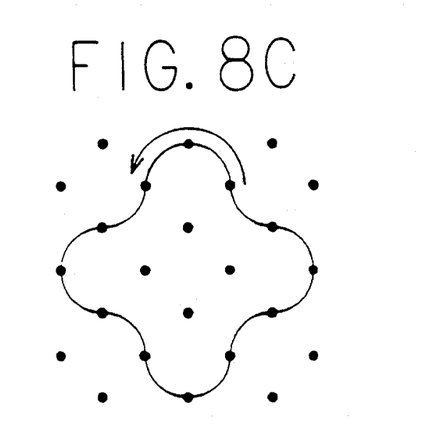
Figure 9A:
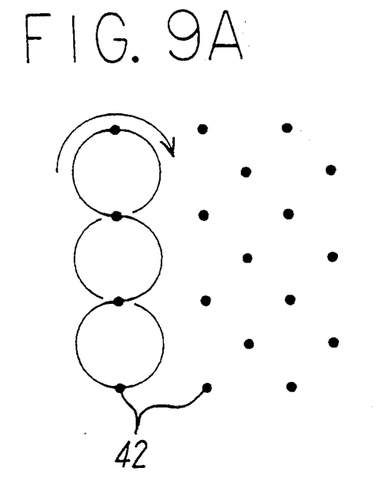
Figure 9B:
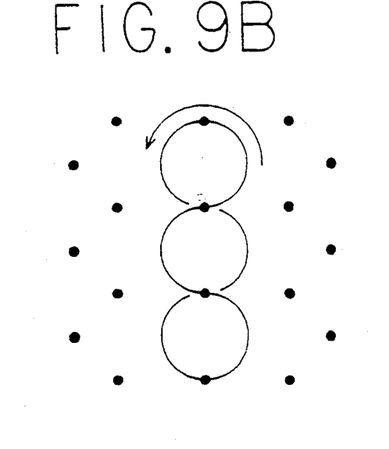
Figure 9C:
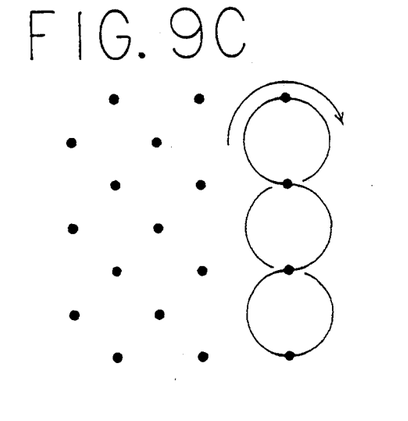
Figure 9D:
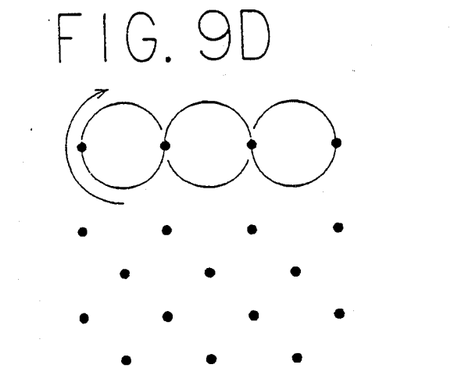
Figure 9E:
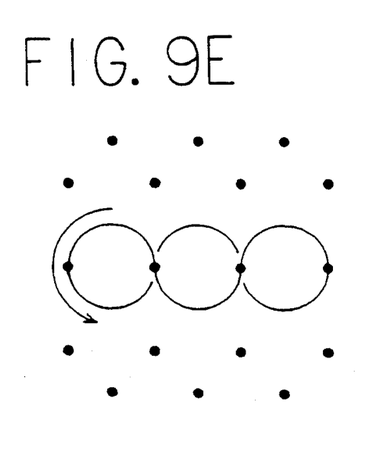
Figure 9F:
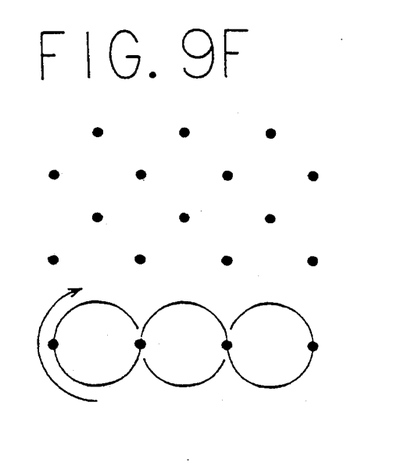

Observations of thread carrier motions in the above-described weaving process reveals that, no matter whether the thread carriers 42 are turned 90° or 180°, they are moved to shift the respective positions according to relatively simple rules within the shift area of the thread carriers. For example, in FIG. 7, as the rotors of the first and second groups are alternately rotated through 90° each time, the thread carriers which are embraced between rotors in adjacent positions are moved to shift their positions, each drawing a locus of movement in the form of a closed loop as shown in FIGS. 8A to 8C. On the other hand, in case the rotors of the first and second groups are rotated through 180° each time, the respective thread carriers are shifted with a locus of movement as shown in FIGS. 9A through 9F. The threads 1 are each folded back at the surface of the three-dimensional fabric 30 and continuously extended in the longitudinal direction as they are interwoven to form the fabric.

Beating can be carried out in the above-described weaving process if desired. The fundamental angle of inclination of the threads 1 in the three-dimensional fabric construction can be varied through adjustments of the extent of beating and the take-up speed.

Figure 10:
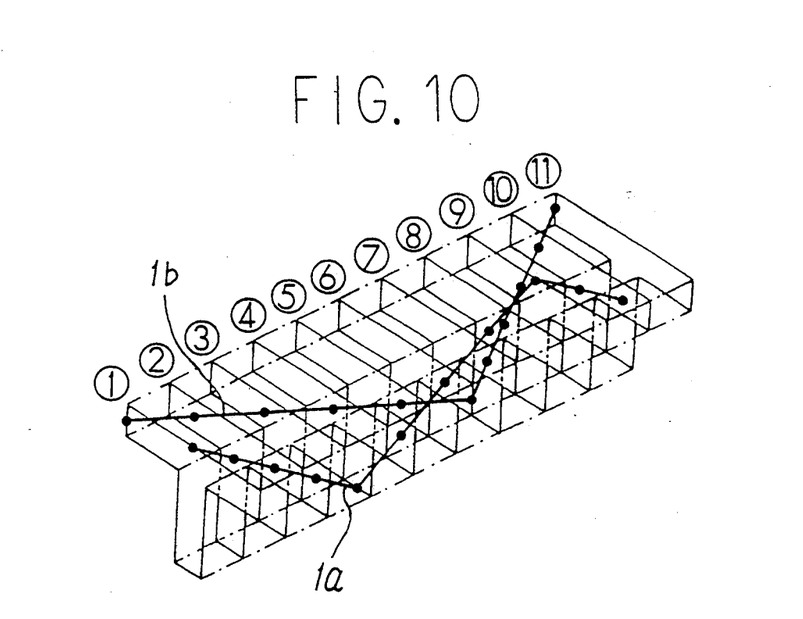
FIG. 10 is a diagrammatic perspective view adopted to explain the manner of thread orientation by way of one of fiber threads constituting the three-dimensional fabric woven on the previously proposed 3D weaving machine.
Figure 11:
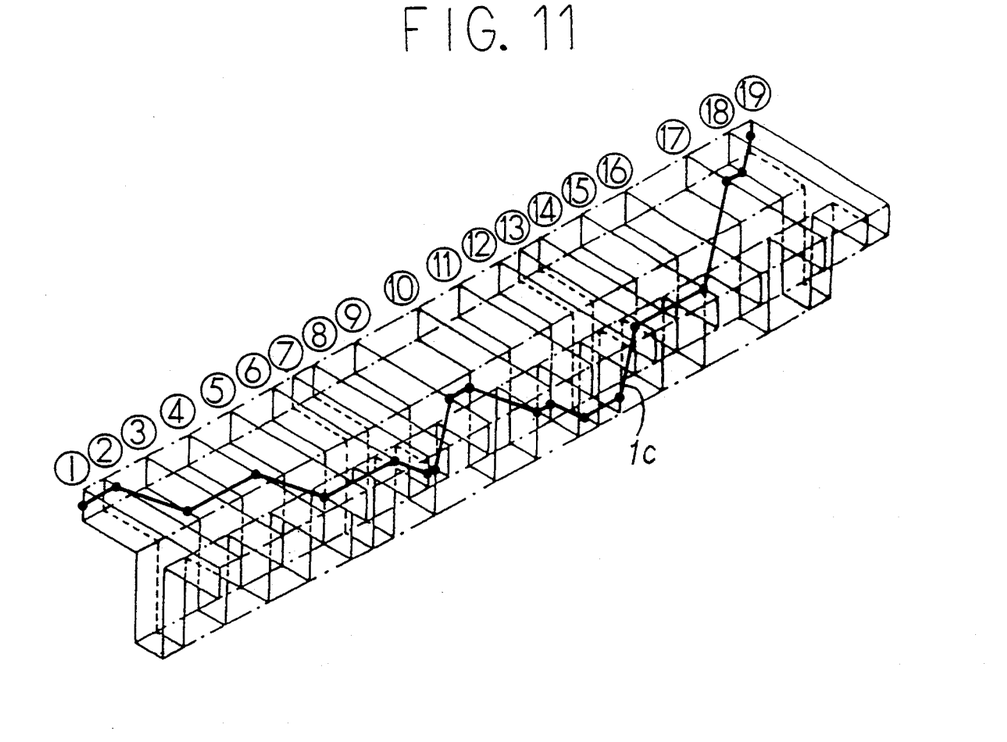
FIG. 11 is a diagrammatic illustration explanatory of the manner of thread orientation in another three-dimensional fabric construction.

Shown in FIG. 10 is an example of orientation of a couple of threads 1$a$ and 1$b$ in a three-dimensional fabric of T-shape in section, formed by the use of carriers which are arranged in a similar shape and by rotating rotors of the first and second groups through 90° in the forward and reverse directions. In case the rotors of the first and second groups are rotated through 180° each time to shift the positions of thread carriers which are arranged in a similar shape, the corresponding thread 1$c$ is oriented in the manner as shown in FIG. 11.

In these figures, only part of the interwoven threads is shown in a perspective view (where core threads are omitted) to facilitate comprehension of the thread orientation. All of the threads which constitute the three-dimensional fabric are oriented substantially in a similar manner and interwoven with each other to make up the fabric.

In order to form thread portions 32 to 35 of a varied orientation angle by altering the orientation angle of these thread portions in the above weaving process, a partially regular weaving cycle is inserted between above-described normal weaving cycles, as shown at A to D of FIG. 5. In this partially regular weaving cycle, the rotation of rotors of the first and second groups is stopped in part of the sectional area of the three-dimensional fabric 30 while carrying out the regular weaving cycle for the rotors in other areas.

Figure 5A:
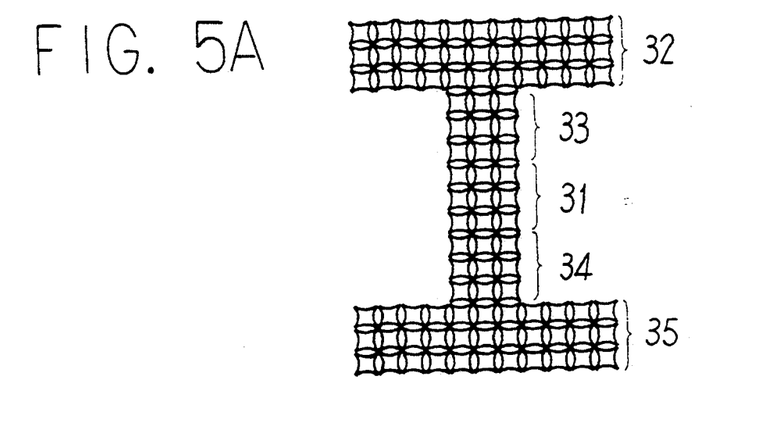
FIGS. 5A through 5D are diagrammatic illustrations explanatory of various phases of rotor rotating operation in a process of weaving the three-dimensional fabric of FIG. 4.
Figure 5B:
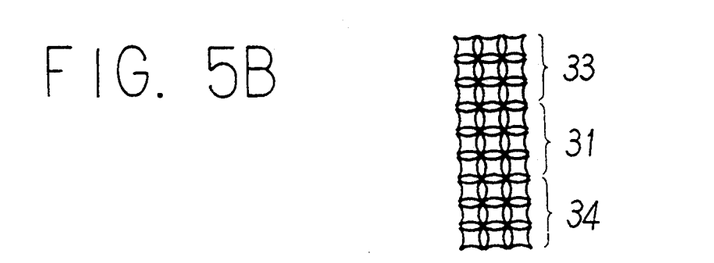

FIGS. 5A through 5D illustrate another arrangement of rotors which are likewise rotationally driven in the weaving cycles for the three-dimensional fabric of FIG. 4. More specifically, FIG. 5A shows a regular weaving cycle in which the rotors 44 of the first and second groups are normally driven in the entire shift area of the thread carriers 42. The regular weaving cycle of FIG. 5A is followed by a partially regular weaving cycle as shown in FIG. 5B where rotors in a regular or basic orientation angle portion 31 as well as rotors in varied orientation angle portions 33 and 34 are rotationally driven group by group as in a regular weaving cycle while stopping rotation of rotors in varied orientation angle portions 32 and 35.

Figure 5C:
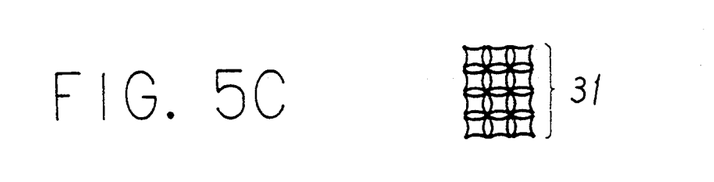
Figure 5D:
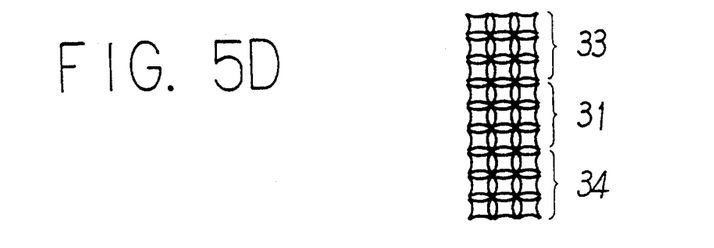

In a succeeding weaving cycle shown in FIG. 5C, which constitutes another partially regular weaving cycle, the rotors in the basic orientation angle portion 31 of the three-dimensional fabric 30 are rotationally driven in a regular manner while stopping rotation of rotors in the varied orientation angle portions 32 to 35. Next, as shown in FIG. 5D, a partially regular weaving cycle similar to that of FIG. 5B is carried out again before returning to a regular weaving cycle as shown in FIG. 5A. Thereafter, the weaving cycles of 5A to 5D are sequentially repeated.

In this manner, the regular and partially regular weaving cycles are carried out and repeated as many times as necessary to weave a fabric which contains varied orientation angle portions 32 to 35 longitudinally in part of the sectional area of the fabric. In case of the three-dimensional fabric of FIG. 4, which is obtained by repeating the weaving cycles of FIGS. 5A to 5D, if the threads of the basic orientation angle portion 31 are oriented with an angle of inclination of 1, for example, the threads in the varied orientation angle portions 33 and 34 are oriented with an angle of inclination of $\frac{1}{2}$ and the threads in the varied orientation angle portions 32 and 35 are oriented with an angle of inclination of $\frac{1}{4}$.

In the above weaving process, if desired, core threads 48 can be woven into the fabric rectilinearly in the longitudinal direction in part of or in the entire sectional area of the fabric, by drawing out core threads 48 through center portions of the rotors 44 in selected positions.

The three-dimensional fabric, woven by the above-described method, has the respective threads 43 folded back at the surface of the fabric to extend continuously in the longitudinal direction of the beam. In addition to the effective enhancement in strength of the composite material, this three-dimensional fabric construction contributes to impart thereto unevenly functioning characteristics effectively by varying the orientation angle of part of the threads 43 which are coextensively interwoven through adjacent varied orientation angle portions. Besides, it is possible to form a 5-axis fabric, which has the core threads 48 rectilinearly oriented in the longitudinal direction in part of or in the part of the three-dimensional fabric thereby to enhance the strength in the direction of the core threads or to restrict the elasticity at the core thread portions.

Beating can be carried out during the weaving process if necessary. The inclination angles of the respective threads can also be adjusted by varying the extent of beating and the take-up speed. Besides, the sectional shape of the three-dimensional fabric can be changed in the course of the weaving operation by altering the carrier shift area.

Figure 1:
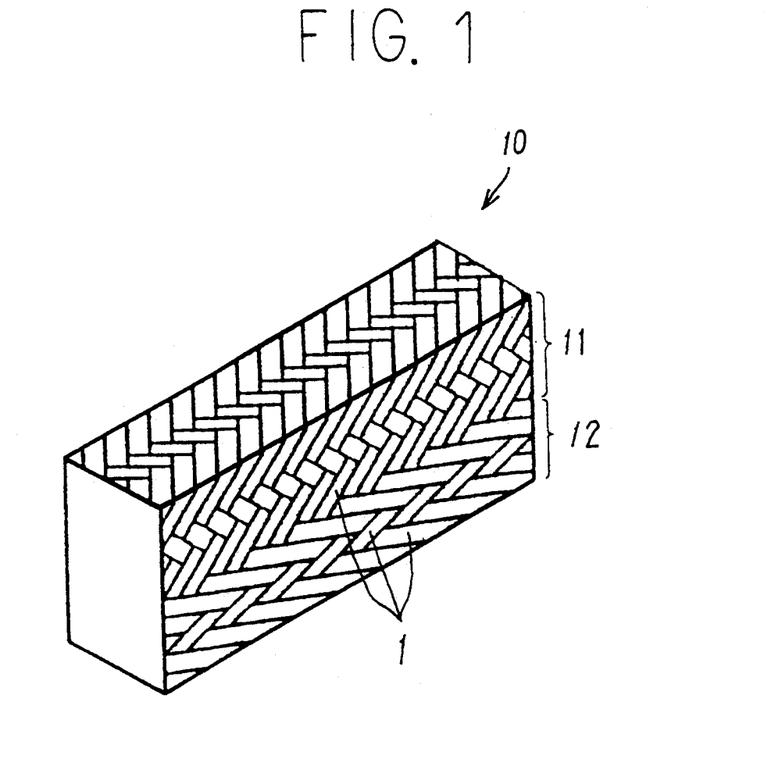
FIG. 1 is a perspective view of a three-dimensional fabric embodying the present invention, the fabric having its thread orientation angle partially varied.
Figure 2:
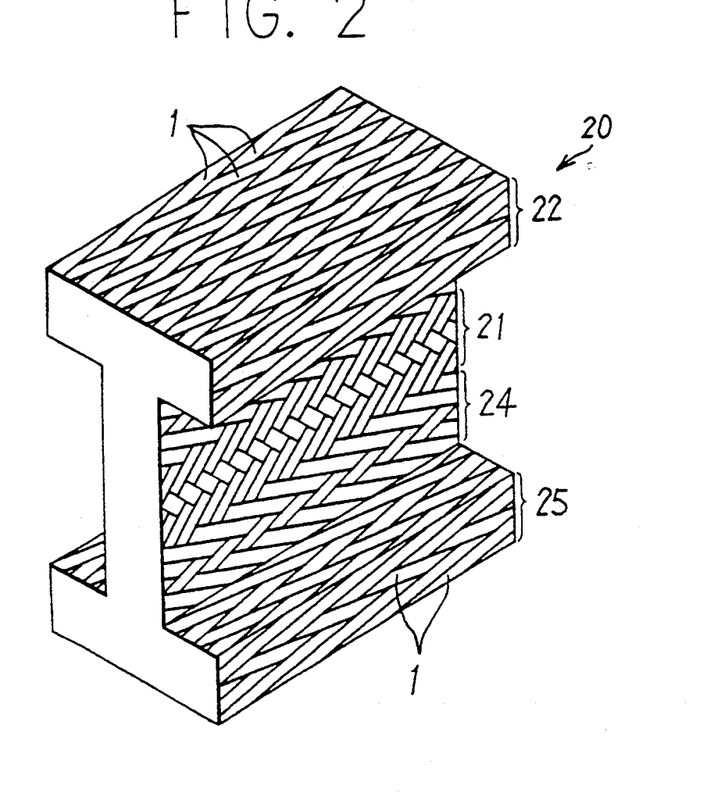
FIG. 2 is a perspective view of another embodiment of the invention, in which the fabric is woven in I-shape in section.
Figure 3:
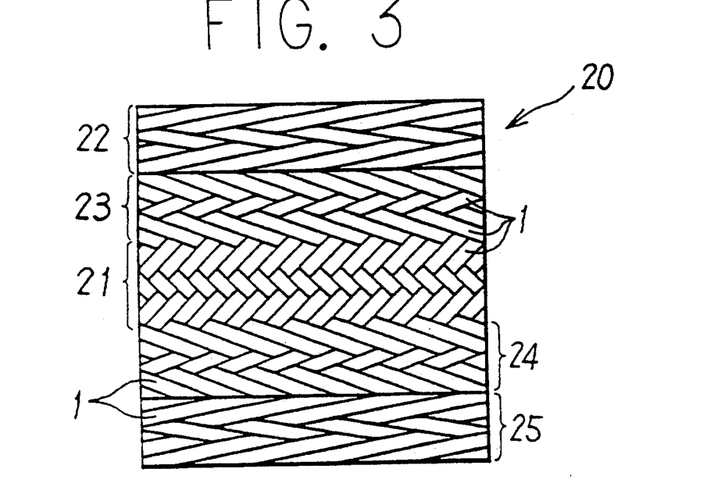
FIG. 3 is a side view of the embodiment of FIG. 2.

Further, although FIGS. 2 to 4 illustrate by way of example three-dimensional fabric constructions involving triple orientation angle variations, it is to be understood that there can be obtained various other three-dimensional fabric constructions for unevenly functioning composite materials by selectively driving the rotors in the partially regular weaving cycles. For instance, in case of the three-dimensional fabric of FIG. 1, which is in the form of an elongated strip or a polygonal column, it is possible to vary the thread orientation angle in the inner portions of the polygonal column from that in the outer peripheral portions. Characteristics akin to a pipe can be obtained by increasing the orientation angle in the inner portions. Further, in case of the three-dimensional fabric constructions of FIGS. 2 to 4 which are formed in an I-beam shape to bear bending loads as its main function. In case the fabric is applied as an I-beam, it is desirable to minimize the thread orientation angle in the upper and lower flange portions which are likely to be subjected to tensile and compressive forces as would result from imposition of bending loads.

Figure 12:
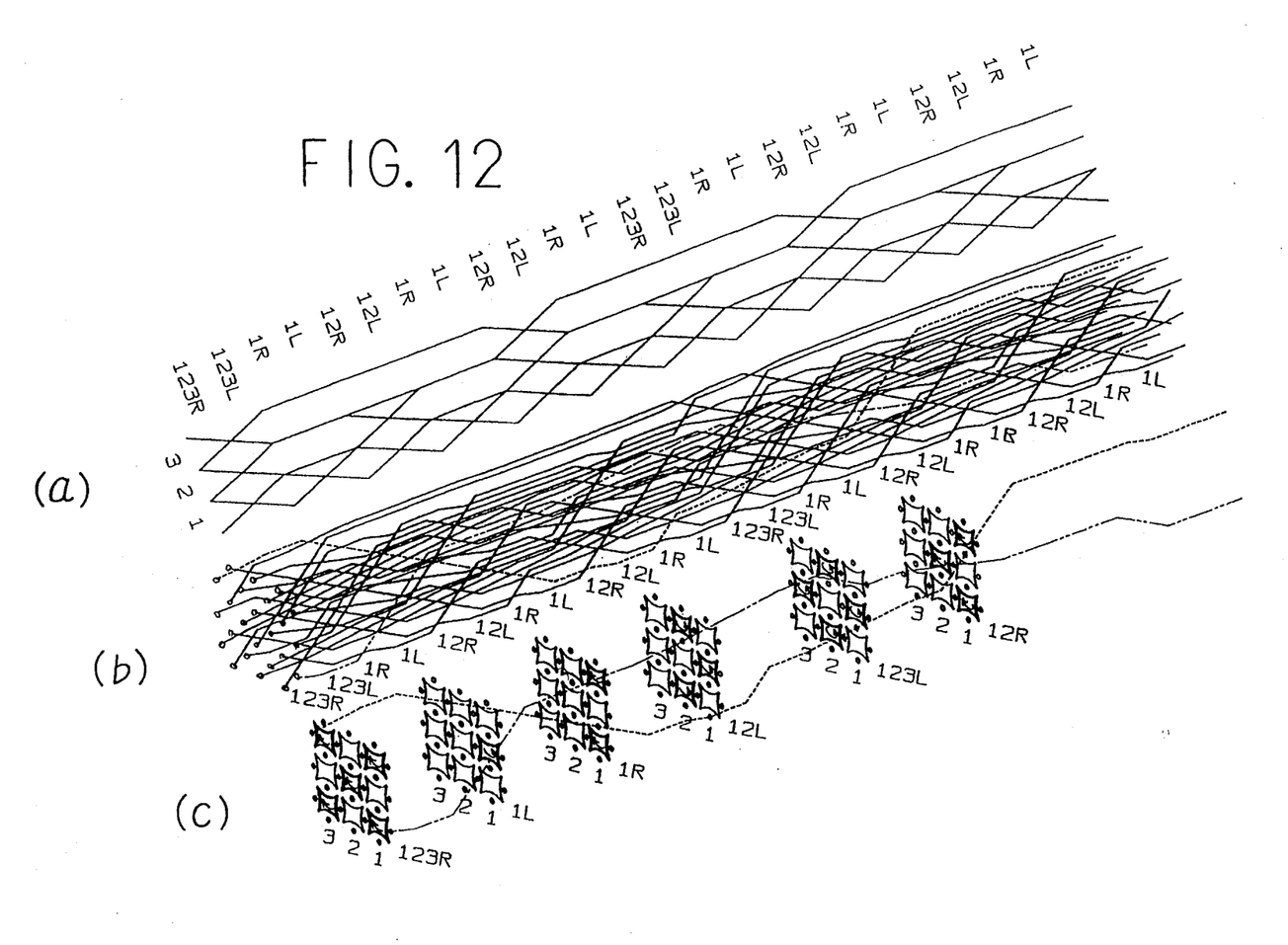
FIG. 12 is a diagrammatic illustration showing an example of procedures of weaving a three-dimensional fabric according to the present invention.

FIG. 12 diagrammatically illustrates a three-dimensional fabric construction which is woven by employing different operation cycles for the rotors in the rightmost, center and leftmost rows in the rotor and carrier arrangement as shown in FIG. 7. Namely, in this case the rotors in the second or center row are operated to complete one weaving action per two weaving actions of the rotors in the first or rightmost row, and the rotors in the third or leftmost row are operated to complete one weaving action per four weaving actions of the rotors in the first or rightmost row. Shown at (a) of this figure are the thread positions in various stages of the weaving operation in a plan view, at (b) the interwoven thread construction in a perspective view, and at (c) the positional relationship between part of the threads and rotors. In this figure, the reference numerals 1 to 3 indicate the rows of rotors participating in the weaving operation, the suffix letters "R" and "L" indicate the direction of rotation (clockwise or counterclockwise) of the rotor in question. Of the rotors which are illustrated diagrammatically, the rotors which are in rotation are bordered with a thicker solid line and accompanied by an arrow which indicates the direction of rotation.

What is claimed is:

1. A three-dimensional fabric which is formed in a desired cross-sectional shape, which comprises:
    a plurality of interwoven threads oriented with an angle of inclination from the longitudinal direction of the three-dimensional fabric, the threads being folded back at the surface of the fabric as said threads are interwoven with each other continuously in the longitudinal direction, wherein said three-dimensional fabric comprises a thread portion with a varied orientation angle formed in part of a sectional area of said fabric by an altered orientation angle, relative to the longitudinal direction of the fabric, of thread portions extending continuously between two adjacent weave portions of said fabric.

2. A three-dimensional fabric as defined in claim 1, which comprises one of a core thread and a core of threads woven into said fabric, with rectilinear orientation in the longitudinal direction thereof, in one of an entire sectional area and a part of the sectional area of said fabric.

3. A method of producing a three-dimensional woven fabric by the use of a rotor-carrier type three-dimensional fabric weaving machine having a plurality of rotors arranged in a matrix of multiple rows and arrays alternately with thread carriers in such a manner as to hold a thread carrier in guide grooves on confronting sides of rotors in adjacent co-operative positions, weaving a three-dimensional fabric a weaving cycle of shifting the position of each thread carrier by rotating one of said rotors in said adjacent co-operative positions while using the groove on the other rotor as a guide, which comprises the steps of:
    dividing said rotors in a carrier shift area, corresponding in configuration to the sectional shape of the fabric to be produced, into two groups each including rotors in nonadjacent row and array positions;
    repeating a cycle of weaving operation where first rotors of a first group are turned through one of 90° and 180° in one direction using rotors of a second group as non-rotatable guides and then turning rotors of said second group through one of 90° and 180° in a reverse direction using the rotors of said first group as non-rotatable guides; and
    inserting for a predetermined number of times a cycle of partially regular weaving operations wherein the rotation of the rotors of said two groups is stopped in part of a sectional area of the three-dimensional fabric while rotating the rotors in other portions so as to form thread portions which are varied in one of an orientation angle and an angle of inclination from the longitudinal direction of the three-dimensional fabric in part of the sectional area of said fabric.

4. A method of weaving three-dimensional fabric as defined in claim 3, which comprises weaving at least one core thread into said three-dimensional fabric, with rectilinear orientation in the longitudinal direction, in one of a part of and an entire sectional area of said fabric by feeding core threads rectilinearly through a center portion of each of selected ones of said rotors.

* * * * *